No. 829,128. PATENTED AUG. 21, 1906.
T. L. & T. J. STURTEVANT.
POWER TRANSMITTING DEVICE.
APPLICATION FILED FEB. 23, 1906.

Witnesses
C. M. Sweeney
J. D. Klinge

Inventors
Thomas L. Sturtevant
Thomas J. Sturtevant
by Hy Salor
Atty

UNITED STATES PATENT OFFICE.

THOMAS LEGGETT STURTEVANT, OF QUINCY, AND THOMAS JOSEPH STURTEVANT, OF WELLESLEY, MASSACHUSETTS.

POWER-TRANSMITTING DEVICE.

No. 829,128.  Specification of Letters Patent.  Patented Aug. 21, 1906.

Application filed February 23, 1906. Serial No. 302,532.

*To all whom it may concern:*

Be it known that we, THOMAS LEGGETT STURTEVANT, residing at Quincy, and THOMAS JOSEPH STURTEVANT, residing at Wellesley, in the county of Norfolk, State of Massachusetts, citizens of the United States, have invented or discovered certain new and useful Improvements in Power-Transmitting Devices, of which the following is a specification, reference being had therein to the accompanying drawings.

This invention relates to automatic clutch devices which are adapted for use in connection with motor-vehicles, but which may also be used in connection with other kinds of machines in the running of which it may sometimes be desirable to permit a power-transmitting or driven shaft to overrun in speed the power-driving shaft.

To this end the invention comprises an automatic clutch device which is coupled to or connected with the axle or shaft to be driven in such a manner as to permit, under certain conditions, the driven axle or shaft to overrun in speed the power-shaft from which it normally derives its motion.

The preferred embodiment of the invention comprises a centrifugally-controlled multiple-disk clutch device which is housed within a fly-wheel and which is coupled to the axle or shaft to be driven through a ratchet or grip device in such a manner that power may be transmitted from the driving-shaft to the axle or shaft to be driven when there is any drag or weight on the driven axle or shaft; but should the latter attain a speed in excess of the speed of the driving or power shaft, either by momentum or gravity, as in a case where a motor-vehicle is coasting downhill, the ratchet or grip coupling connection between the normally driven axle or shaft and the driving or power shaft will permit the normally driven axle or shaft to overrun the speed of the driving or power shaft. Also in case the engine or motor should slow down to a speed lower than that to which it may be desirable immediately to reduce the speed of the driven axle or shaft the latter will continue to run by momentum or otherwise until the speed of the normally driven axle or shaft is reduced to that of the driving or power shaft or of a driven part connected therewith.

Figure 1:
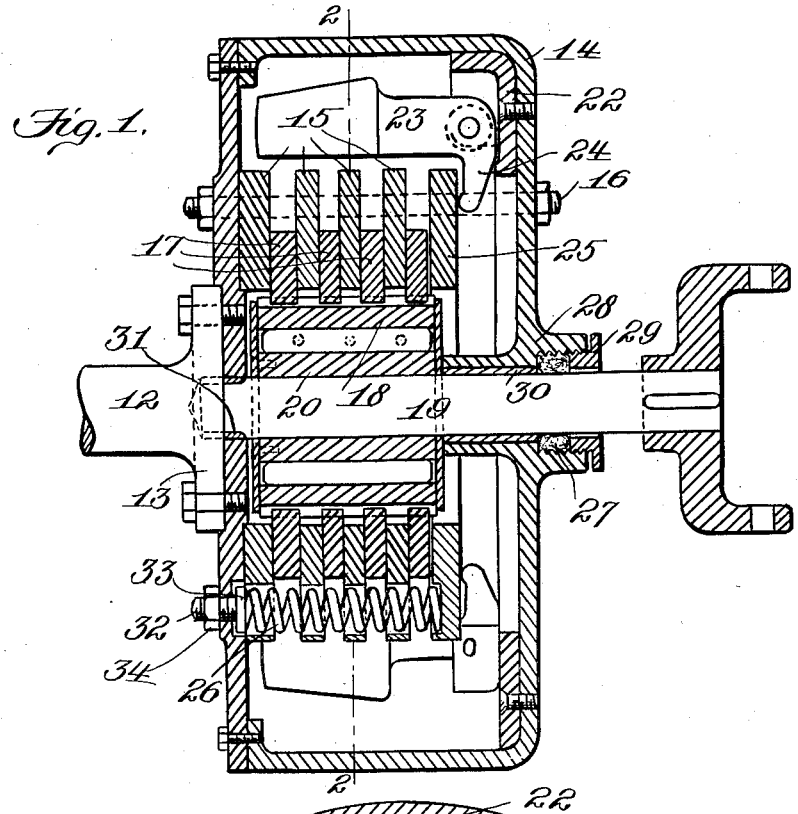
Figure 2:
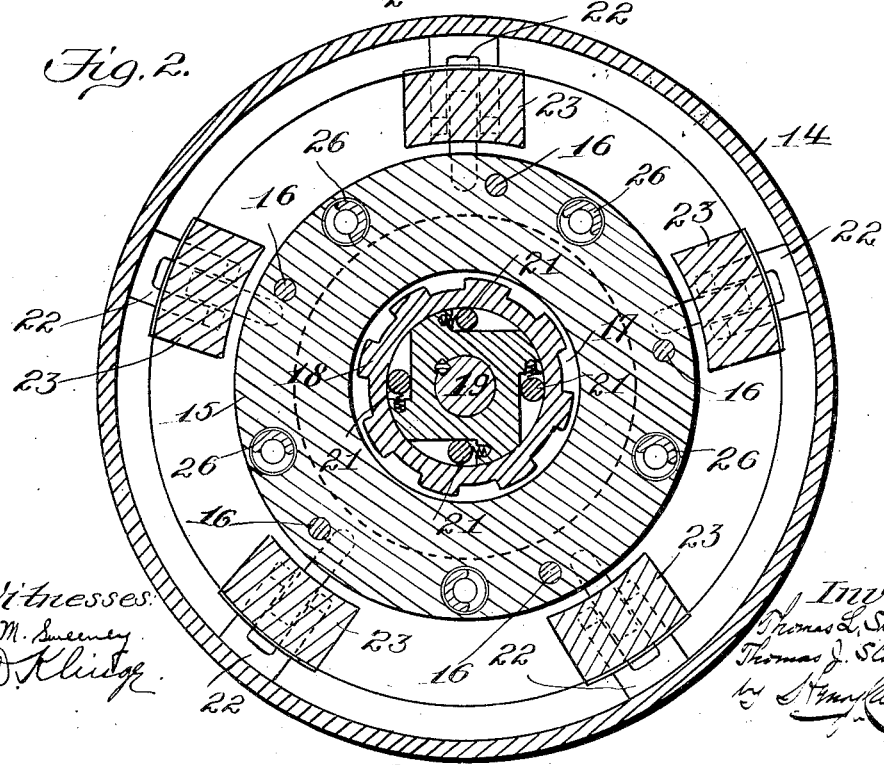

In the accompanying drawings, Figure 1 is a diametrical sectional view of a multiple-disk automatic clutch device embodying the present invention; and Fig. 2 is a transverse sectional view of the same on line 2 2, Fig. 1.

Referring to the drawings, 12 denotes a power-shaft, which may be the main shaft of a motor or engine or of a shaft connected therewith, said shaft 12 being provided with a head or flange 13, bolted to a hollow fly-wheel or casing 14, within which are inclosed a series of clutch rings or disks 15, rigidly fixed relative to said fly-wheel or casing by means of bolts 16, and a second series of clutch rings or disks 17, having at their inner edges notched engagement with a ring 18. Keyed to the driven or power-transmitting axle or shaft 19 is a hub 20, suitably recessed for the reception of a series of spring-pressed grip-rollers 21, by which the ring 18 is normally coupled to the said hub 20, keyed to the axle or shaft 19. Pivotally mounted in brackets 22, suitably secured within the fly-wheel 14, are weighted centrifugal levers 23, having short right-angular arms 24, adapted to press against a master-plate 25 to force the same laterally against the stress of springs 26, which normally prevent the said master-plate from forcing the clutch-disks 15 and 17 into frictional clutch engagement with each other; but when the speed of the fly-wheel is sufficient to cause the weighted centrifugal arms 23 to be forced outward, in opposition to the stress of said springs, the said master-plate will be moved inward by the short arms 24 of the said centrifugal lever, and thus force the clutch-disks into frictional clutching engagement with each other, so that the rotary motion of the said fly-wheel 14, derived from the power-shaft 12, will be imparted to the driven shaft or axle through the hub 20, the grip-rollers 21, and the ring 18, with which the clutch-disks 17 are in notched engagement.

It is desirable that the clutch-disks run in oil, so as to avoid wear and heating, as there is more or less slip between the said clutch-disks when they are being forced into frictional clutching engagement with each other or when said frictional clutch engagement is released or broken, and thus the connection or disconnection between the driving and the driven parts may be gradually or softly effected, thereby avoiding any sudden jerks or strains. To this end, therefore, the flywheel or casing 14 is preferably made oil-tight, so that there will be no wastage of the lubricating-oil which may be introduced into the same, and the driven axle or shaft 19 is surrounded with a packing-gland or stuffing-box afforded by a recess 27, formed in the hub 28 of the fly-wheel, and which recess is filled with a suitable packing, held therein by means of a nut 29. In the normal operation of the invention the driven shaft or axle and the stuffing-box or gland revolve together; but when the shaft or axle 19 overruns the fly-wheel 14 the said shaft or axle will turn in the said packing-box and in the bearings afforded by the sleeves 30 and 31 within the hub 28.

The stress of the springs 26 may be regulated or varied by means of screws 32 bearing against disks or washers 33, against which the outer ends of the springs 26 abut, so that by turning the said screws in or out the stress of the said springs may be increased or diminished, and when any desired adjustment has been effected the said disks will be locked in place by set-nuts 34.

From the foregoing it will be apparent that the clutch disks or rings of the multiple-disk clutch device, and forming part of the coupling means between the power-shaft 12 and the driven shaft or axle 19, will be forced into frictional clutch engagement with each other at any such desired speed of rotation of the fly-wheel 14 as may be predetermined by the adjustment of the stress of the springs 26, and when the friction-disks are thus in clutching engagement with each other power will be transmitted to the driven shaft or axle 19 from the driving or power shaft 12, rigid with the said fly-wheel. If, however, at any time the speed of rotation of the driven axle or shaft 19 should exceed the speed of rotation of the fly-wheel 14, the silent ratchet or grip device afforded by the coupling grip-rollers 21 will let go, and the coupling connection being thus broken the shaft or axle 19 will at all such times be free to overrun the fly-wheel and the power-shaft which drives said fly-wheel. Thus if the invention be embodied in a motor-vehicle the said vehicle need not necessarily be slowed down by reason of the sudden slowing down of the engine or motor, or in coasting downhill it will not be necessary to disconnect or stop the motor, as is now usually the case when it is desired to coast at speed greater than the speed which would be equal to the driving speed of the motor. Thus coasting may be freely indulged in without paying any particular attention to the motor, and when the road resistance lowers the coasting speed, so that the speed of rotation of the shaft or axle 19 is decreased to the running speed of the power-shaft or fly-wheel, the multiple-disk clutch device will gradually come again into operation, and the vehicle will then be driven in its normal manner.

Having thus described our invention, we claim and desire to secure by Letters Patent—

1. In a power-transmitting mechanism, the combination with a driving-shaft, of a rotary shaft or axle to be driven therefrom, and centrifugally-controlled coupling means between said power-shaft and said driven shaft or axle, said coupling means comprising a ratchet or grip device constructed and arranged to permit the said driven shaft or axle to overrun or turn faster than it is driven by the said power-shaft, and a fly-wheel rotating with said driving-shaft and within which said coupling means are inclosed, said fly-wheel being provided with bearings for said driven shaft or axle so that the latter may turn in said bearings when overrunning said driving-shaft.

2. In a power-transmitting mechanism, the combination with a power-shaft, of a rotary shaft or axle to be driven therefrom, centrifugally-controlled coupling means between said power-shaft and said driven shaft or axle, said coupling means comprising a ratchet or grip device constructed and arranged to permit the said driven shaft or axle to overrun or turn faster than it is driven by the said power-shaft, and a fly-wheel within which said coupling means are inclosed.

3. In a power-transmitting mechanism, the combination with a power-shaft, of a shaft or axle to be driven therefrom, a centrifugal clutch device and a ratchet or grip device between said power-shaft and said driven shaft or axle, said ratchet or grip device being constructed and arranged to permit the said driven shaft or axle to overrun or turn faster than it is driven by said power-shaft, and a fly-wheel within which said automatic clutch device and said grip device are inclosed.

4. In a power-transmitting mechanism, the combination with a power-shaft, of a shaft or axle to be driven therefrom, a centrifugal clutch device and a ratchet or grip device between said power-shaft and said driven shaft or axle, said ratchet or grip device being constructed and arranged to permit the said driven shaft or axle to overrun or turn faster than it is driven by said power-shaft, and an oil-tight casing within which said automatic clutch device and said grip device are inclosed.

5. In a power-transmitting mechanism, the combination with a power-shaft, of a shaft or axle to be driven therefrom, a centrifugal clutch device and a ratchet or grip device between said power-shaft and said driven shaft or axle, said ratchet or grip device being constructed and arranged to permit the said driven shaft or axle to overrun or turn faster than it is driven by said power-shaft, and a fly-wheel within which said automatic clutch device and said grip device are inclosed, said fly-wheel being provided with a stuffing-box to render it oil-tight and with a bearing in which said driven shaft or axle can turn, independently of said fly-wheel, when it overruns the said fly-wheel and power-shaft.

6. In a power-transmitting mechanism, the combination with a power-driven fly-wheel and a shaft or axle to be driven therefrom and journaled therein, of a centrifugally-controlled clutch device within said fly-wheel and a silent ratchet or grip device also within said fly-wheel and which connects said clutch device with the said driven shaft or axle and which is constructed and arranged to permit the latter to overrun or turn independently of said fly-wheel.

7. In a power-transmitting mechanism, the combination with a power-driven fly-wheel and a shaft or axle to be driven therefrom, and journaled therein of a centrifugally-controlled clutch device also within said fly-wheel and which connects said clutch device with the said driven shaft or axle, and which is constructed and arranged to permit the latter to overrun or turn independently of said fly-wheel, said fly-wheel being oil-tight, so that said centrifugally-controlled clutch device may run in oil without wastage of the latter.

8. In a power-transmitting mechanism, the combination with a power-driven fly-wheel and a shaft or axle to be driven therefrom and journaled therein, of a centrifugally-controlled, clutch device within said fly-wheel, and a silent ratchet or grip device also within said fly-wheel and which connects said clutch device with the said driven shaft or axle, and which is constructed and arranged to permit the latter to overrun or turn independently of said fly-wheel, said fly-wheel being provided with a stuffing-box, to render it oil-tight, and with a bearing in which said driven shaft or axle can turn independently of said fly-wheel, when it overruns the said fly-wheel and power-shaft.

9. In a power-transmitting mechanism, the combination with a power-driven fly-wheel and a shaft or axle to be driven therefrom and journaled therein, of a centrifugally-controlled, multiple-disk clutch device within said fly-wheel, and a silent ratchet or grip device also within said fly-wheel and which connects said clutch device with the said driven shaft or axle, and which is constructed and arranged to permit the latter to overrun or turn independently of said fly-wheel.

10. In a power-transmitting mechanism, the combination with a power-driven fly-wheel and a shaft or axle to be driven therefrom and journaled therein, of a centrifugally-controlled, multiple-disk, clutch device within said fly-wheel, and a silent ratchet or grip device also within said fly-wheel and which connects said clutch device with the said driven shaft or axle, and which is constructed and arranged to permit the latter to overrun or turn independently of said fly-wheel, said fly-wheel being oil-tight, so that said centrifugally-controlled clutch device may run in oil without wastage of the latter.

11. In a power-transmitting mechanism, the combination with a power-driven fly-wheel and a shaft or axle to be driven therefrom and journaled therein, of a centrifugally-controlled, multiple-disk, clutch device within said fly-wheel, and a silent ratchet or grip device also within said fly-wheel and which connects said clutch device with the said driven shaft or axle and which is constructed and arranged to permit the latter to overrun or turn independently of said fly-wheel, said fly-wheel being provided with a stuffing-box, to render it oil-tight, and with a bearing in which said driven shaft or axle can turn, independently of said fly-wheel, when it overruns the said fly-wheel and power-shaft.

12. In a power-transmitting mechanism, the combination with the power-driven fly-wheel 14, of the shaft or axle 19 journaled in said fly-wheel, the hub 20 within said fly-wheel and having peripheral recesses, spring-pressed grip-rollers in said recesses, the ring 18, also within said fly-wheel, to be engaged by said grip-rollers, and an automatic clutch device, also within said fly-wheel, and by which the said fly-wheel may be operatively connected with said ring.

13. In a power-transmitting mechanism, the combination with the power-driven fly-wheel, 14, of the shaft or axle 19 journaled in said fly-wheel, the hub 20 within said fly-wheel and having peripheral recesses, spring-pressed grip-rollers in said recesses, the ring 18, also within said fly-wheel, to be engaged by said grip-rollers and a centrifugally-controlled, multiple-disk, clutch device, also within said fly-wheel, and by which the said fly-wheel may be operatively connected with said ring.

14. In a power-transmitting mechanism, the combination with a driving-shaft, of a fly-wheel connected with said shaft to rotate therewith, a power transmitting or driven shaft journaled within said fly-wheel and adapted to rotate independently thereof, a centrifugally-controlled clutch device within said fly-wheel, and a roller-grip device by which said clutch device may be connected with said power transmitting or driven shaft when the clutching parts of said clutch device are engaged with each other, but which roller-grip device is constructed and arranged to permit the said power transmitting or driven shaft to overrun in speed the said driving-shaft and fly-wheel.

15. In a power-transmitting mechanism, the combination with a driving-shaft, of a fly-wheel connected with said shaft to rotate therewith, a power transmitting or driven shaft journaled within said fly-wheel and adapted to rotate independently thereof, a centrifugally-controlled clutch device within said fly-wheel, and a roller-grip device by which the said clutch device may be connected with said power transmitting or driven shaft when the clutching parts of said clutch device are engaged with each other, but which roller-grip device is constructed and arranged to permit the said power transmitting or driven shaft to overrun in speed the said driving-shaft and fly-wheel, said fly-wheel being tightly inclosed so as to be adapted to contain and hold, without waste, a lubricant for the running parts housed within the said fly-wheel.

In testimony whereof we affix our signatures in presence of two witnesses.

THOMAS LEGGETT STURTEVANT.
THOMAS JOSEPH STURTEVANT.

Witnesses:
W. F. ELLIS,
L. H. STURTEVANT.